US009821388B2

(12) United States Patent
Seto et al.

(10) Patent No.: US 9,821,388 B2
(45) Date of Patent: Nov. 21, 2017

(54) HORIZONTAL BAND SAW MACHINE AND METHOD FOR INSTALLING BAND SAW BLADE

(71) Applicants: AMADA HOLDINGS CO., LTD., Kanagawa (JP); AMADA MACHINE TOOLS CO., LTD., Kanagawa (JP)

(72) Inventors: Akio Seto, Kanagawa (JP); Masataka Kitai, Kanagawa (JP)

(73) Assignees: AMADA HOLDINGS CO., LTD., Kanagawa (JP); AMADA MACHINE TOOLS CO., LTD., Kanagawa (JP)

( * ) Notice: Subject to any disclaimer, the term of this patent is extended or adjusted under 35 U.S.C. 154(b) by 140 days.

(21) Appl. No.: 14/769,467

(22) PCT Filed: Feb. 7, 2014

(86) PCT No.: PCT/JP2014/052917
§ 371 (c)(1),
(2) Date: Aug. 21, 2015

(87) PCT Pub. No.: WO2014/141788
PCT Pub. Date: Sep. 18, 2014

(65) Prior Publication Data
US 2015/0375316 A1      Dec. 31, 2015

(30) Foreign Application Priority Data

Mar. 11, 2013   (JP) ................................ 2013-047549

(51) Int. Cl.
*B23D 53/04*   (2006.01)
*B23D 53/08*   (2006.01)
(Continued)

(52) U.S. Cl.
CPC ............. *B23D 53/04* (2013.01); *B23D 53/08* (2013.01); *B23D 55/00* (2013.01); *B23D 55/082* (2013.01)

(58) Field of Classification Search
CPC ........ B23D 53/04; B23D 53/08; B23D 55/00; B23D 55/082
See application file for complete search history.

(56) References Cited

U.S. PATENT DOCUMENTS

| | | | | |
|---|---|---|---|---|
| 5,213,022 A | * | 5/1993 | Elgan ..................... | B23D 53/04 83/797 |
| 2002/0035893 A1 | * | 3/2002 | Schurb ................. | B23D 63/001 76/40 |
| 2006/0174862 A1 | * | 8/2006 | Yamasaki ............ | B23D 55/084 125/21 |

FOREIGN PATENT DOCUMENTS

| | | |
|---|---|---|
| JP | 2-15913 | 1/1990 |
| JP | 4-223819 | 8/1992 |

(Continued)

OTHER PUBLICATIONS

International Search Report, including English-language translation thereof, for PCT/JP2014/052917 dated Apr. 28, 2014.

*Primary Examiner* — Jonathan Riley
*Assistant Examiner* — Liang Dong
(74) *Attorney, Agent, or Firm* — Greenblum & Bernstein, P.L.C.

(57) ABSTRACT

A horizontal band saw machine includes a base, a vertically-movable housing disposed above the base, a pair of wheels that are disposed at a lower portion of the housing and a distance between whose axis lines is changeable, a band saw blade lopped over the pair of wheels, and saw blade guides that are provided on the base. An installation position of the band saw blade is set lower than a cutting end position of a workpiece to be cut by the band saw blade. The housing can (Continued)

move the pair of wheels to the installation position. The pair of wheels can be inserted into an region surrounded by the band saw blade that is set on the saw blade guides when being moved to the installation position with the distance shortened.

7 Claims, 15 Drawing Sheets

(51) Int. Cl.
     *B23D 55/00*      (2006.01)
     *B23D 55/08*      (2006.01)

(56)      References Cited

FOREIGN PATENT DOCUMENTS

| JP | 2005-262352 | 9/2005 |
| JP | 4984076 | 7/2012 |

* cited by examiner

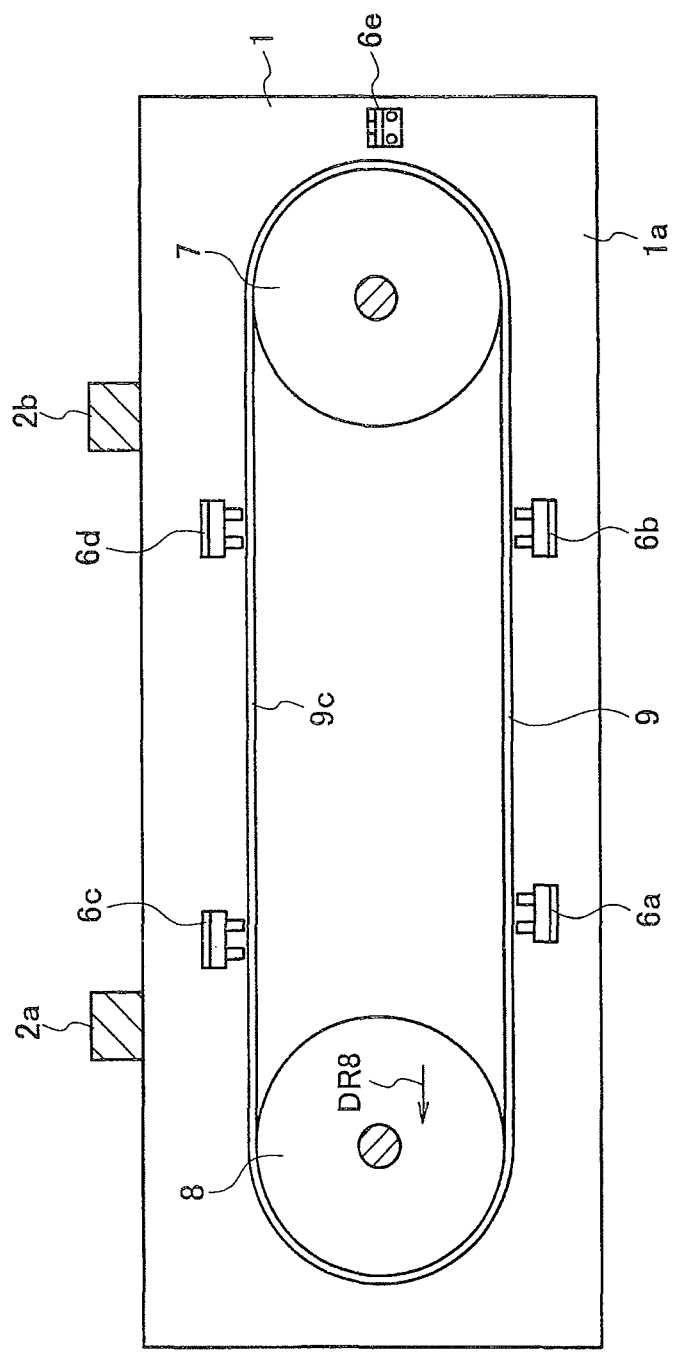

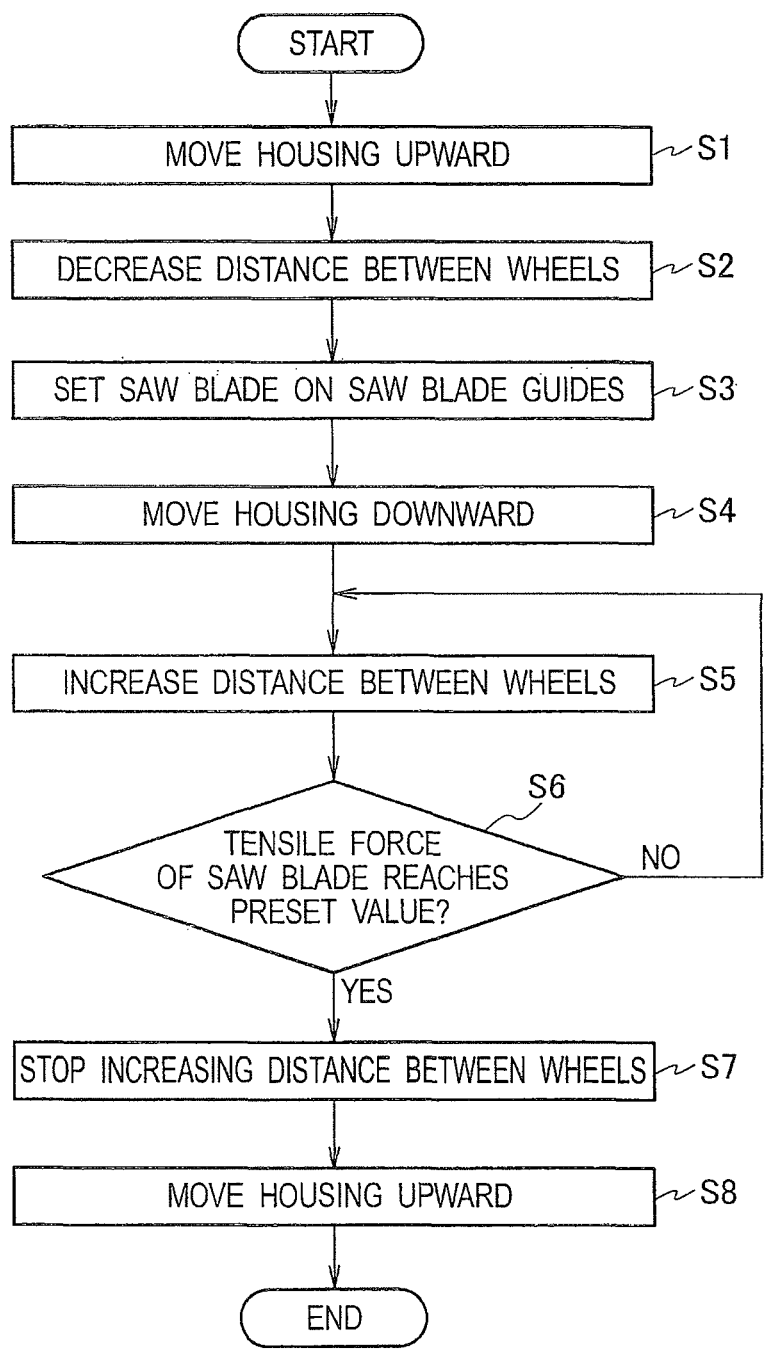

ly, and to a method for
HORIZONTAL BAND SAW MACHINE AND METHOD FOR INSTALLING BAND SAW BLADE

TECHNICAL FIELD

The present invention relates to a horizontal band saw machine in which a pair of wheels over which a saw blade is looped is disposed horizontalinstalling a band saw blade.

BACKGROUND ART

A horizontal band saw machine that includes a base mounted on a floor, a vertically-movable housing disposed above the base, a pair of wheels disposed horizontally at a lower portion of the housing, and an endless saw blade looped over the pair of wheels with to have a twist angle 0°, is generally known.

In such a horizontal band saw machine, a workpiece inserted between the base and the housing is cut by the saw blade tensely provided in a horizontal plane at the lower portion of the housing while moving the housing downward. Due to the twist angle 0°, a long object cannot be cut, but lifetime of the saw blade can be expanded. In addition, the horizontal band saw machine with the twist angle 0° is suitable for cutting off or slicing a short object.

When replacing a saw blade in the horizontal band saw machine, the saw blade in a horizontal posture is lifted up from beneath of the housing, and then attached to the pair of wheels. However, a band saw blade is generally very thin, and thereby its shape (the horizontal posture) cannot be kept by itself. Therefore, the saw blade is needed to be supported by plural operators, so that many man-hours are required and its operation is not easy. A Patent Document 1 listed below discloses an example for improving this problem.

In a method disclosed in the Patent Document 1, a jig that can be mechanically coupled with the pair of wheels (pulleys) from beneath is used. The jig is vertically movable by a predetermined stroke. First, for attaching a saw blade, the jig on which the saw blade is set is lifted up from beneath to attach it to the pair of wheels. Next, the jig attached to the pair of wheels is moved vertically to make a height level of the saw blade in line with a height level of the pair of wheels. Then, the saw blade is installed on the pair of wheels by expanding a distance between the two wheels. Finally, the jig is removed from the wheels. By using this jig, the operation can be done by one person.

PRIOR ART DOCUMENT

Patent Document

Patent Document 1: Japanese Granted Patent. No. 4984076

SUMMARY OF INVENTION

However, according to the method disclosed in the Patent Document 1, the special jig is needed for every distance between the wheels, so that production costs of a jig(s) become high. In addition, the operator has to support the jig when attaching the jig to the wheels. In addition, in order to make the height level of the saw blade in line with the height level of the pair of wheels, he has to lift up the jig further. These operations impose a heavy burden on the operator.

Therefore, an object of the present invention is to provide a horizontal band saw machine and a method for installing a band saw blade that can reduce costs for producing a jig used for installing a saw blade and can reduce an operator's burden.

A first aspect of the present invention provides a horizontal band saw machine comprising: a base; a housing that is disposed above the base and movable vertically; a pair of wheels that are disposed horizontally at a lower portion of the housing and a distance between whose axis lines is changeable; a band saw blade that is endless and is lopped over the pair of wheels; and a plurality of saw blade guides that are provided on an upper plate of the base and on which the band saw blade is set when installing the band saw blade onto the pair of wheels, wherein an installation position that is a height position of the band saw blade set on the saw blade guides is set lower than a cutting end position of a workpiece to be cut by the band saw blade that is looped over the pair of wheels, the housing is configured to be capable of moving the pair of wheels to the installation position, and the pair of wheels is configured to be capable of being inserted into an region surrounded by the band saw blade that is set on the saw blade guides when being moved downward by the housing to the installation position in a state where the distance between the axis lines is shortened.

Here, it is preferable that the saw blade guides contact with the band saw blade at plural positions to support the band saw blade from beneath, and each thereof has an edge contact portion that contacts with a lower edge of the band saw blade and a side-face contact portion that contacts with an outer side-face of the band saw blade.

Further, it is preferable that only one of the pair of wheels is movable to change the distance between the axis lines, and all of the saw blade guides is disposed on a side of the other of the pair of wheels with respect to a flat plane that includes a rotating axis line of the one and intersects with a center line intersecting with rotating axis lines of the pair of wheels.

A second aspect of the present invention provides A method for installing a band saw blade in a horizontal band saw machine in which an endless band saw blade is looped over a pair of wheels that are disposed horizontally and a distance between whose axis lines is changeable, the method comprising: setting the band saw blade on a plurality of saw blade guides that are disposed beneath the pair of wheels; moving the pair of wheels, the distance between whose axis lines being shortened, to a height level of the band saw blade by inserting the pair of wheels into an region surrounded by the band saw blade set on the saw blade guides; and installing the band saw blade onto the pair of wheels by expanding the distance between the axis lines.

BRIEF DESCRIPTION OF DRAWINGS

FIG. 14 It is a front view for explaining the installation operation of the saw blade (fourth process).

FIG. 15 It is a flowchart of the installation operation of the saw blade.

DESCRIPTION OF EMBODIMENTS

A horizontal band saw machine 51 according to an embodiment will be explain hereinafter with reference to the drawings. Upper, lower, front, rear, left, and right directions used in following descriptions are shown in FIG. 1 and FIG. 2.

Figure 1:
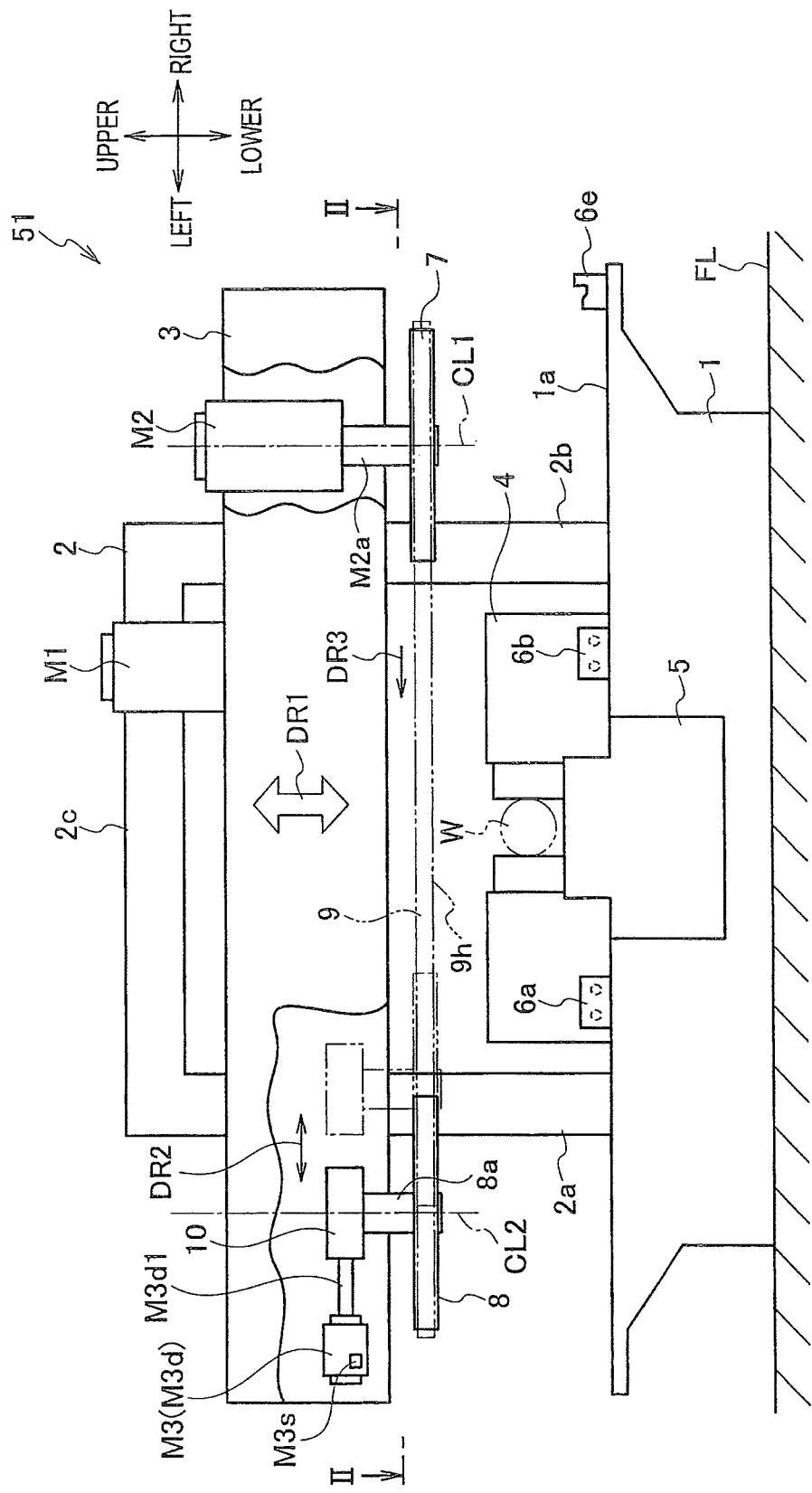
FIG. 1 It is a front view of a horizontal band saw machine according to an embodiment.
Figure 2:
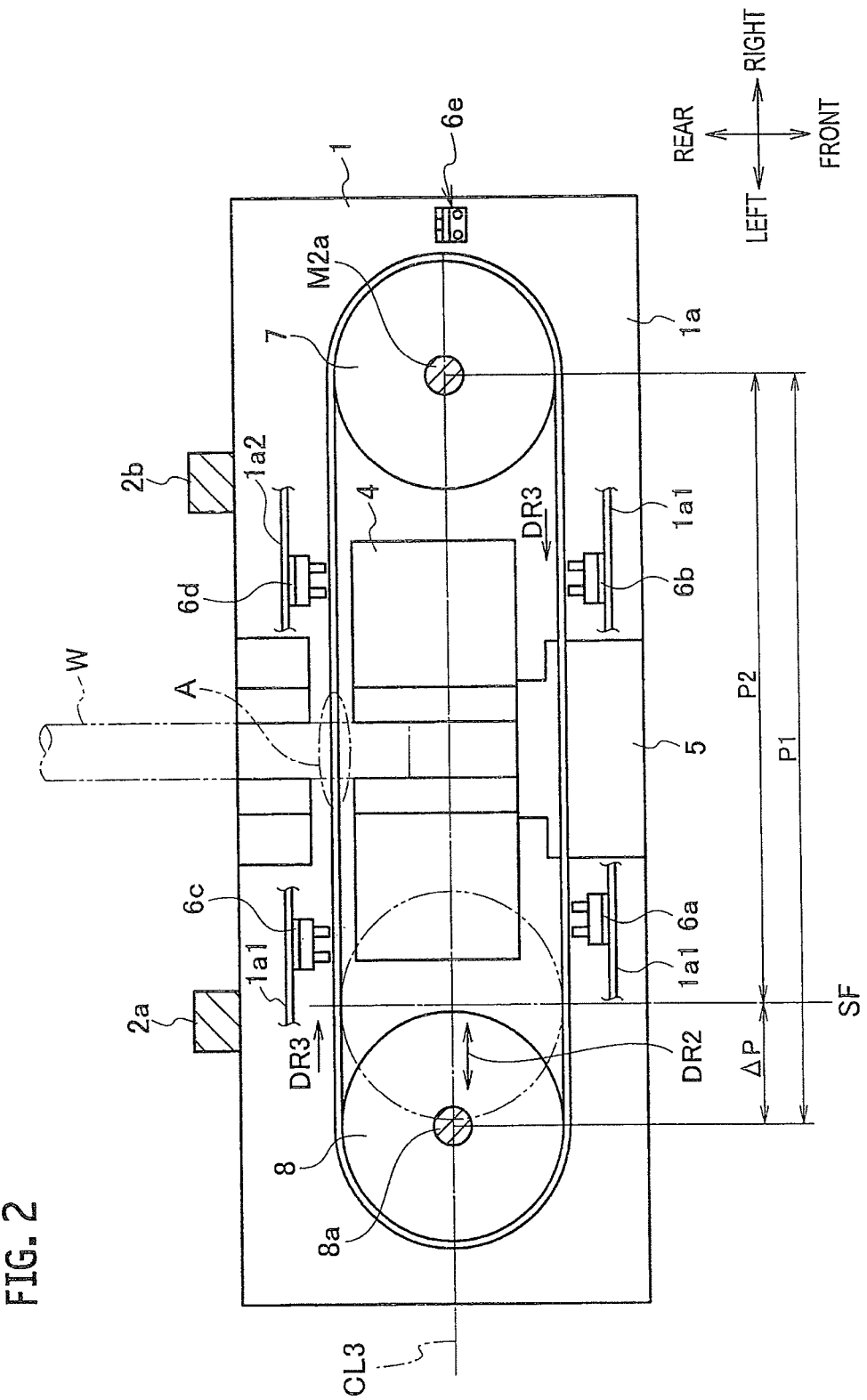
FIG. 2 It is a cross-sectional (plan) view taken along a line II-II shown in FIG. 1.
Figure 3:
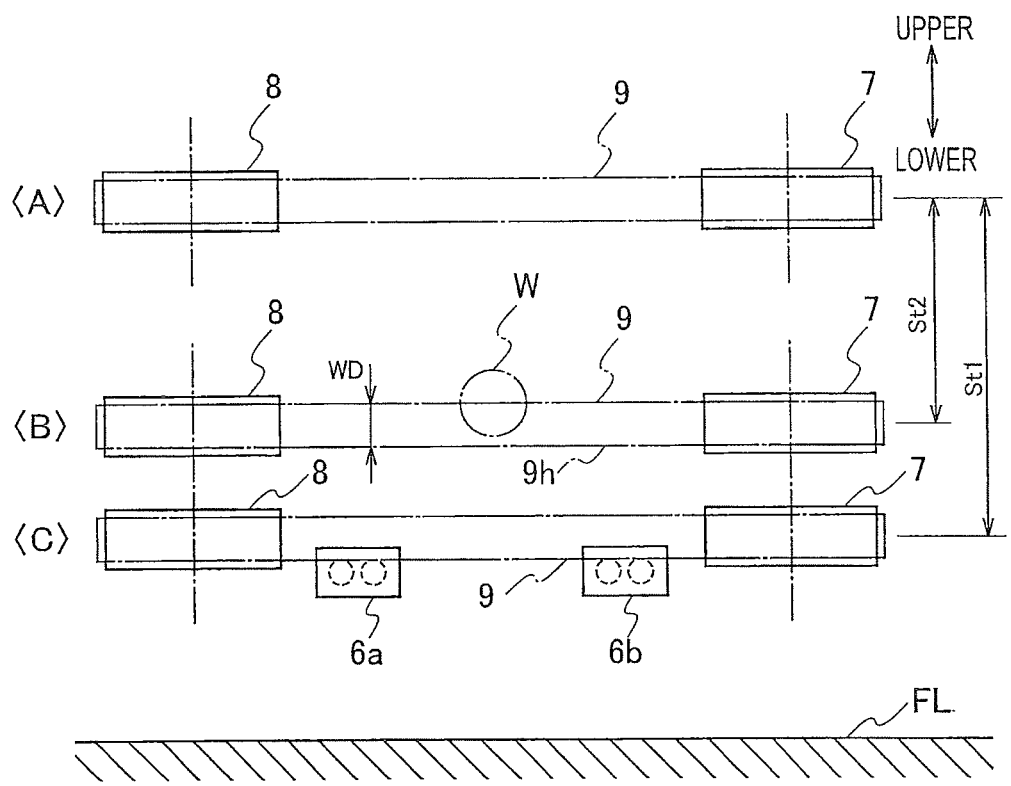
FIG. 3 It is a front view for explaining a height position of wheels of the band saw machine.

As shown in FIG. 1 to FIG. 3, the band saw machine 51 includes a base 1 that is mounted on a floor FL, a frame 2 that is provided behind the base 1 and has a pair of support posts 2a and 2b and a beam 2c connecting upper portions of the support posts 2a and 2b, and a housing 3 that is supported by the support posts 2a and 2b via linear guides (not shown in the drawings) so as to be movable vertically (a double-headed arrow DR1). A pair of wheels 7 and 8 that face to an upper plate 1a of the base 1 is disposed horizontally on a lower side of the housing 3. An endless band saw blade 9 (hereinafter, simply referred as the saw blade 9) is looped over the wheels 7 and 8. The band saw blade 9 can be attached-to and removed-from the pair of wheels 7 and 8. The upper plate 1a of the base 1 functions as an oil pan. A workpiece support 4 that supports a workpiece W (drawn as a round bar in this embodiment) and a chute 5 for discharging a cut product(s) are provided at the center on the upper plate 1a.

Five saw blade guides 6a to 6e are provided on the upper plate 1a. A pair of the saw blade guides 6a and 6b is disposed on a front side on the upper plate 1a, a pair of the saw blade guides 6c and 6d is disposed on the rear side, and the saw blade guide 6e is disposed on the right side. The saw blade guides 6a to 6e will be described later in detail.

A drive unit M1 that moves the housing 3 vertically by a motor is mounted on the beam 2c of the frame 2. A maximum stroke of the housing 3 is St1 (see FIG. 3: shown by height levels of the wheels 7 and 8). The stroke St1 includes three height positions, a waiting position, a cutting end position, and an installation position. The waiting position <A> in FIG. 3 is the highest position in the stroke St1, and is a reference position of the housing 3 that is in a waiting (not-in-operation) state. The cutting end position <B> in FIG. 3 is lower than the reference position, and is a position where cutting is ended after lower edge teeth 9h of the saw blade 9 go out downward from the workpiece W. In normal cutting, the housing 3 is moved vertically between the waiting position and the cutting end position (stroke St2). The installation position <C> in FIG. 3 is the lowest position in the stroke St1, and is far lower than the cutting end position. When replacing the saw blade 9, the housing 3 is moved down to the installation position to remove the saw blade 9 onto the saw blade guides 6a and 6b and so on, and then a new saw blade 9 is installed by using the saw blade guides 6a and 6b and so on. A difference of the height levels of the cutting end position and the installation position is larger than a width WD of the saw blade 9 in FIG. 3, but may be smaller than the width WD.

A drive unit M2 that includes a motor having a rotating axis line CL1 is provided on one side (a right side in the present embodiment) of the housing 3. The wheel 7 is attached at an end of a rotating shaft M2a extended out from the drive unit M2 downward. A drive unit M3 that horizontally moves the wheel 8 passively rotated about a rotating axis line CL2 extending vertically is provided on another side (a left side in the present embodiment) of the housing 3. An upper end of a rotating shaft 8a of the wheel 8 is coupled with a block 10. The block 10 (i.e. the wheel 8) is moved horizontally by the drive unit M3 (a double-headed arrow DR2). As shown in FIG. 2, a maximum stroke of the block 10 (i.e. the wheel 8) is ΔP. A drive source of the drive unit M3 is a cylinder M3d, and the block 10 is coupled with a cylinder rod M3d1. Therefore, a distance between the axis lines of the wheels 7 and 8 can be changed in a range of the stroke ΔP.

When a maximum value of the distance between the axis lines of the wheels 7 and 8 is denoted as P1 and the minimum value is denoted as P2, ΔP=P1−P2. In addition, a sensor M3s that measures a tensile force applying to the saw blade 9 looped over the wheels 7 and 8 (or, a force that pulls the wheel 8 toward the wheel 7) is provided in the drive unit M3 (see FIG. 1). Note that a timer Tm for measuring a travelling time of the wheel 8 may be provided instead of the sensor M3s. If the horizontal band saw machine 51 is controlled by an external computer (not shown in the drawings), the timer Tm may be included in the computer.

The saw blade 9 is wound around the wheels 7 and 8 so that its teeth 9h are pointed downward. The saw blade 9 is shown by two-dot chain lines in FIG. 1, and shown by solid lines in FIG. 2. An adequate tensile force is applied to the saw blade 9 by moving the wheel 8 leftward by the drive unit M3. The saw blade 9 to which the tensile force is being applied is fed circularly in a predetermined direction (DR3) due to rotations of the wheel 7 by the drive unit M2.

The workpiece W is cut by the band saw machine 51 according to following processes. First, in a state where the saw blade 9 is installed on the wheels 7 and 8, the housing 3 is lifted up to the waiting position by the drive unit M1 (state shown in FIG. 1). After the workpiece W is set at the workpiece support 4, the housing 3 is moved downward by the drive unit M1, and the wheel 7 is rotated by the drive unit M2 (i.e. the saw blade 9 is traveled). The saw blade 9 cuts the workpiece W along with a downward motion of the housing 3, and a portion that has cut away is discharged through the chute 5. The downward motion of the housing 3 is stopped when it reaches the cutting end position, and then the housing 3 is lifted up to the waiting position and travelling of the saw blade 9 is stopped.

Figure 4:
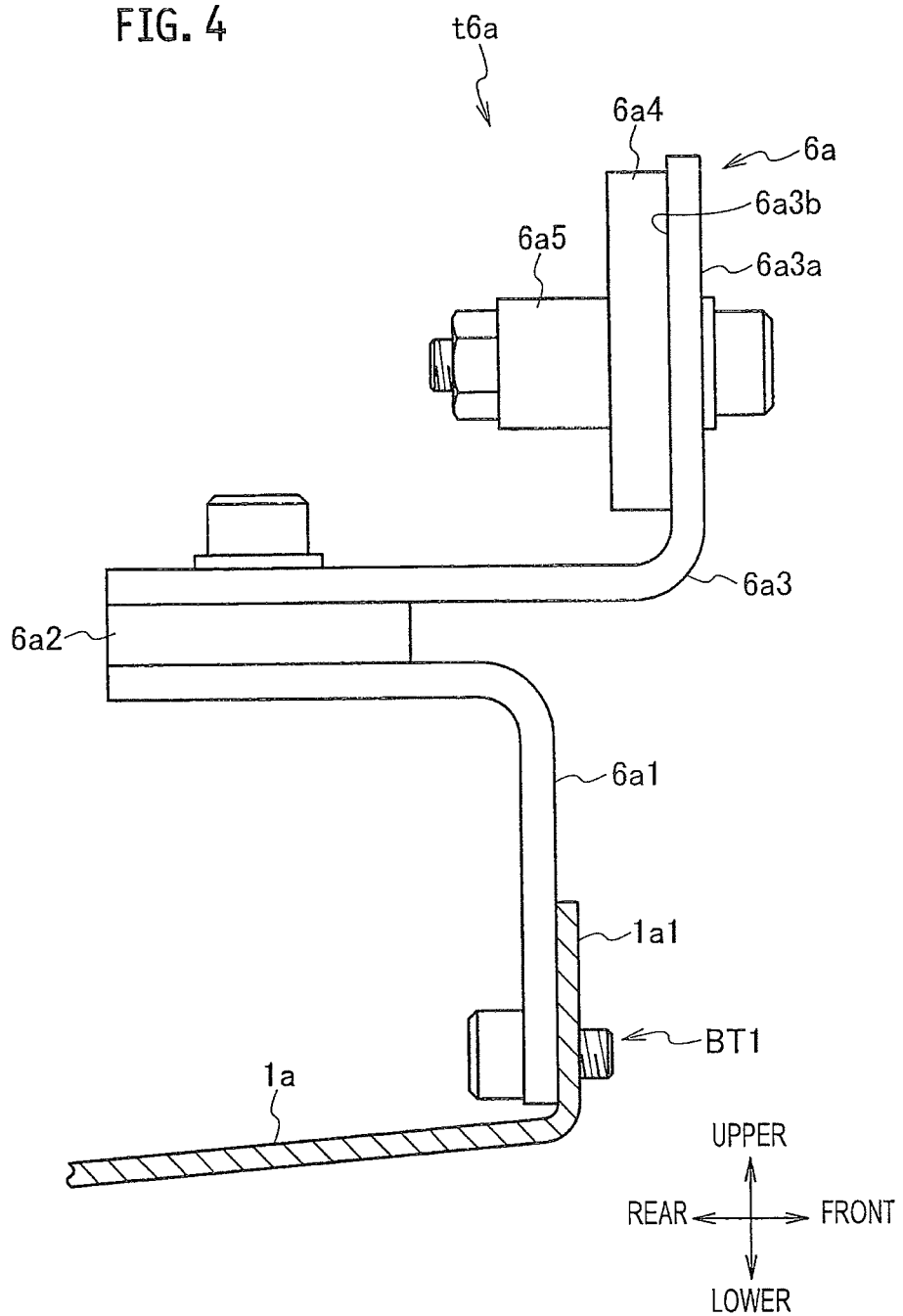
FIG. 4 It is a side view of a saw blade guide 6*a* of the band saw machine.

Next, the saw blade guides 6a to 6e will be described with reference to FIG. 4 to FIG. 6. The saw blade guides 6a to 6e function as support members that temporarily support the saw blade 9 from beneath. The saw blade guides 6a to 6c have an identical shape to each other, and are called as Type A. The saw blade guide 6d is called as Type B, and the saw blade guide 6e is called as Type C.

The saw blade guide 6a will be described with reference to FIG. 4 as a representative of the Type A. The saw blade guide 6a is fixed, by bolts BT1, with a flange 1a1 of the upper plate 1a that is bent upward. The flange 1a1 of the upper plate 1a that functions as an oil pan as described above functions as an oil fence, and the upper plate 1a is sloped so as to be made lower toward its center in order to gather oils.

The saw blade guide 6a has a base plate 6a1 that is fixed with the flange 1a1 and has a cross-sectional L-shape, and a guide plate 6a3 that is fixed with the base plate 6a1 and has a cross-sectional L-shape. Since the guide plate 6a3 is fixed with the base plate 6a1 with a rubber spacer 6a2 interposed therebetween, it can slightly swing with respect to the base plate 6a1 and the flange 1a1.

The guide plate 6a3 has a guide flange 6a3a raised vertically. A contact portion t6a is fixed with a rear face 6a3b of the guide flange 6a3a by bolts and nuts. The contact portion t6a is comprised of a side-face contact portion 6a4 that has a rectangular shape, and a pair of edge contact portions 6a5 each of which has a cylindrical sleeve shape. The base plate 6a1 and the guide plate 6a3 are made of metal such as steel. The side-face contact portion 6a4 and the edge contact portions 6a5 are made of resign such as polyacetal.

The saw blade guide 6b has an identical structure to that of the saw blade guide 6a, and has a contact portion t6b corresponding to the contact portion t6a. The saw blade guide 6c is fixed with the flange 1a1 of the upper plate 1a so as to face to the saw blade guide 6a. Also, the saw blade guide 6c has an identical structure to that of the saw blade guide 6a, and has a contact portion t6c corresponding to the contact portion t6a. When installing the saw blade 9, the contact portions t6a, t6b and t6c directly contact with the saw blade 9 to support the saw blade 9 temporarily.

The Type B saw blade 6d will be described with reference to FIG. 5. The saw blade guide 6d is fixed, by bolts BT2, with a flange 1a2 of the upper plate 1a that is bent upward. The saw blade guide 6d has a bracket 6d1 fixed with the flange 1a2, a hinge 6d2, an intermediate bracket 6d3 coupled with the bracket 6d1 via the hinge 6d2, and a guide plate 6d5 that is fixed with the intermediate bracket 6d3 with a spacer 6d4 interposed therebetween and has a cross-sectional L-shape. An inclined portion 6d1a that is bent backward so as to be inclined is provided at an upper portion of the bracket 6d1. The hinge 6d2 has a first hinge plate 6d2a fixed with a front face of the inclined portion 6d1a, and a second hinge plate 6d2b that can swing about a horizontal rotating axis line CL4 (a double-headed arrow DR4) with respect to the first hinge plate 6d2a. The intermediate bracket 6d3 is fixed with the second hinge plate 6d2b, and has a bolt BT5 that regulates a swinging amount of the hinge 6d2.

Figure 5:
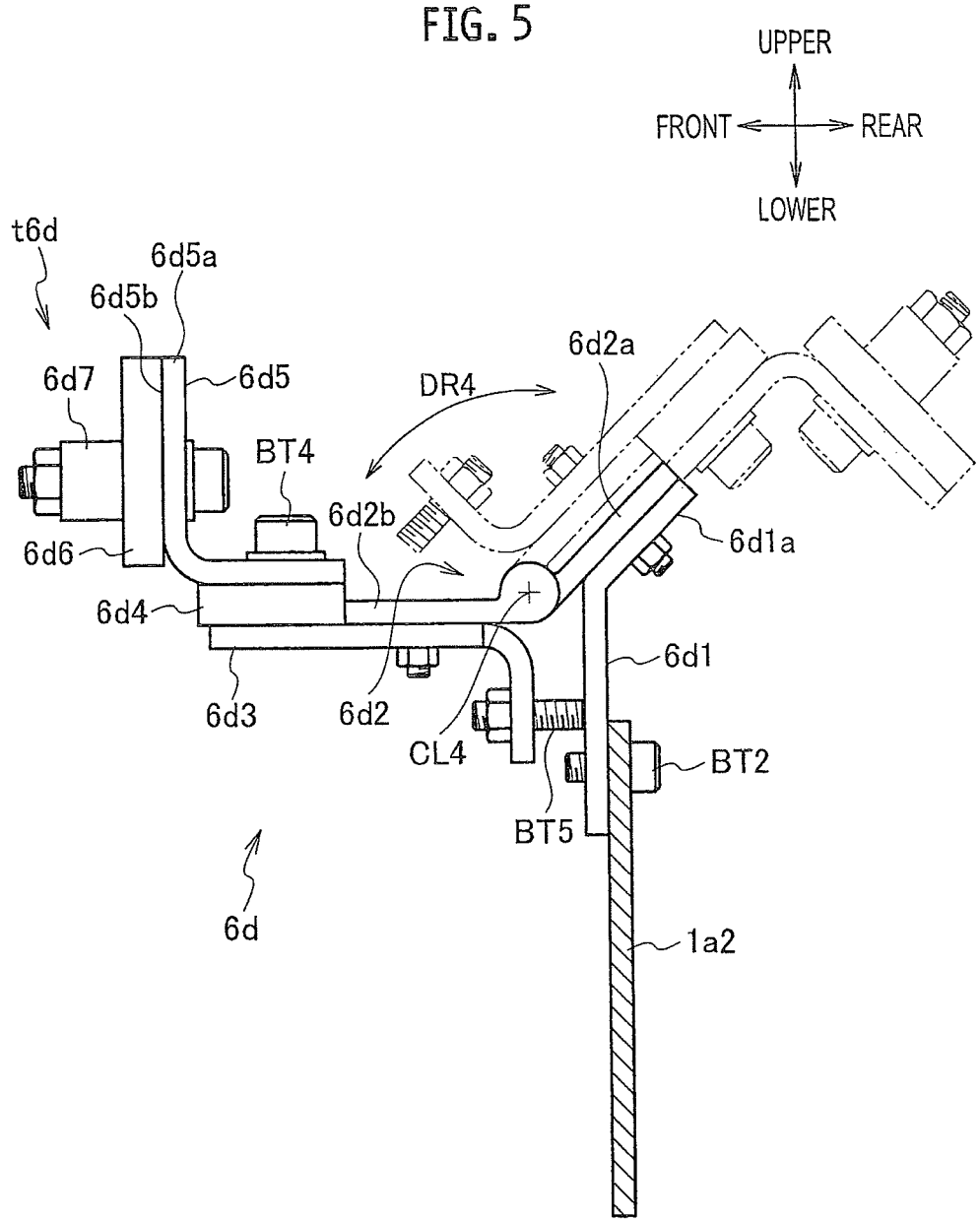
FIG. 5 It is a side view of a saw blade guide 6*d* of the band saw machine.
Figure 6:
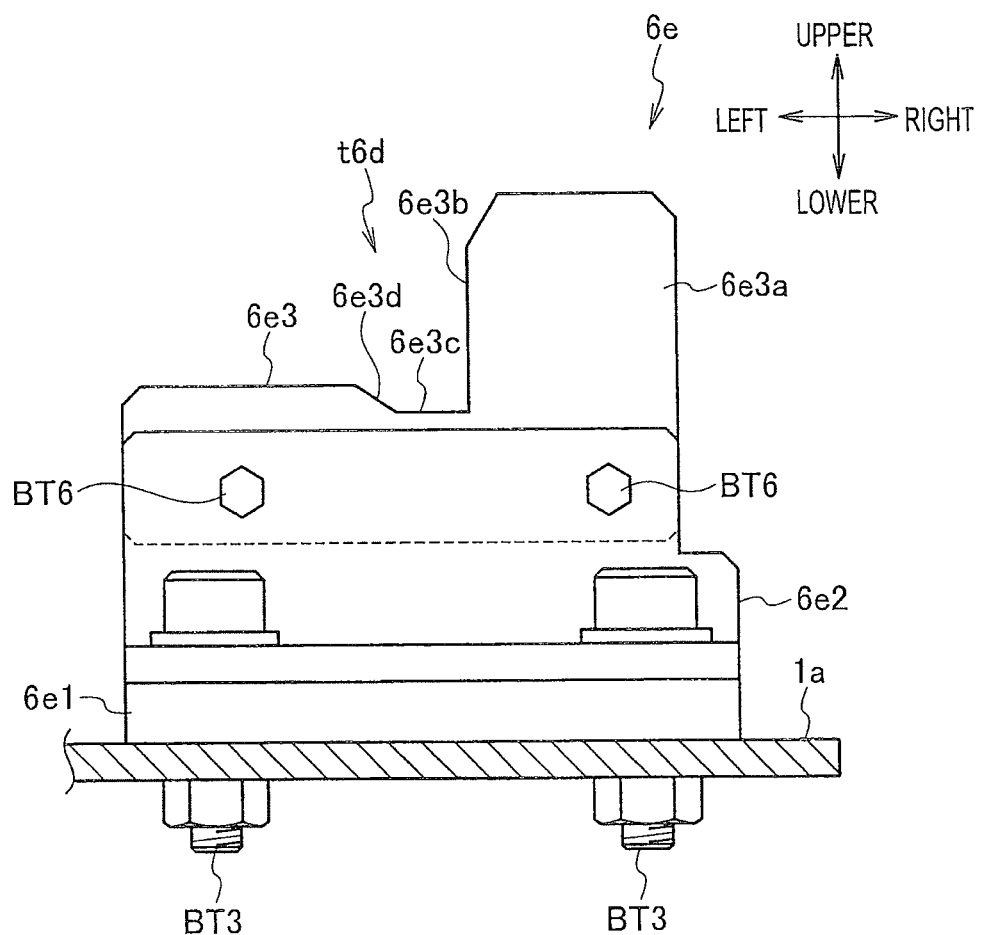
FIG. 6 It is a front view of a saw blade guide 6*e* of the band saw machine.

Since the guide plate 6d5 is fixed, by bolts BT4, with the intermediate bracket 6d3 with the rubber spacer 6d4 interposed therebetween, it can slightly swing with respect to the intermediate bracket (with respect to the flange 1a2 in a normal state shown in FIG. 5). The guide plate 6d5 has a guide flange 6d5a raised vertically in the normal state. A contact portion t6d is fixed with a front face 6d5b of the guide flange 6d5a by bolts and nuts. The contact portion t6d is comprised of a side-face contact portion 6d6 that has a rectangular shape, and a pair of edge contact portions 6d7 each of which has a cylindrical sleeve shape. The bracket 6d1, the hinge 6d2, the intermediate bracket 6d3 and the guide plate 6d5 are made of metal such as steel. The side-face contact portion 6d6 and the edge contact portions 6d7 are made of resign such as polyacetal. When installing the saw blade 9, the contact portion t6d directly contacts with the saw blade 9 to support the saw blade 9 temporarily.

In the saw blade guide 6d, the intermediate bracket 6d3, the spacer 6d4 and the guide plate 6d5 rotate integrally with respect to the bracket 6d1 (the flange 1a2) due to the hinge 6d2. Their rotation range is a range between the normal state (the state shown by solid lines in FIG. 5) and an evacuated state (the state shown by two-dot chain lines in FIG. 5) where they are rotated by more than 90° from the normal state. The above-described bolt BT5 of the intermediate bracket 6d3 functions as a stopper that restricts a counter-clockwise rotation from the normal state in FIG. 5. A rotational position of the normal state is regulated by a contact of a distal end of the bolt BT5 with the bracket 6d1.

The Type C saw blade guide 6e will be described with reference to FIG. 6. The saw blade guide 6e is fixed on the upper plate 1a of the base 1 by bolts BT3. The saw blade guide 6e has a spacer 6e1, a plate 6e2 that has a cross-sectional L-shape, and a guide plate 6e3 that is fixed with the plate 6e2 by bolts BT6. Since the plate 6e2 is fixed on the upper plate 1a with the rubber spacer 6e1 interposed therebetween, it can slightly swing with respect to the upper plate 1a.

The plate 6e2 is made of metal such as steel. The guide plate 6e3 is made of resign such as polyacetal. The guide plate 6e3 has a side-face contact portion 6e3a that is protruded upward, a notched portion (an edge contact portion) 6e3c, and an inclined edge 6e3d that is inclined downward toward the notched portion 6e3c. The notched portion 6e3c and a vertical edge 6e3b of the side-face contact portion 6e3a comprise a contact portion t6e. When installing the saw blade 9, the contact portion t6e directly contacts with the saw blade 9 to support the saw blade 9 temporarily.

Subsequently, a method for installing the saw blade 9 to the band saw machine 51 will be described with reference to FIG. 7 to FIG. 14 and a flowchart shown in FIG. 15. The description is started with a state where the saw blade 9 is not installed on the wheels 7 and 8. When installing the saw blade 9, a protection cover may be attached to the lower edge teeth 9h.

Figure 7:
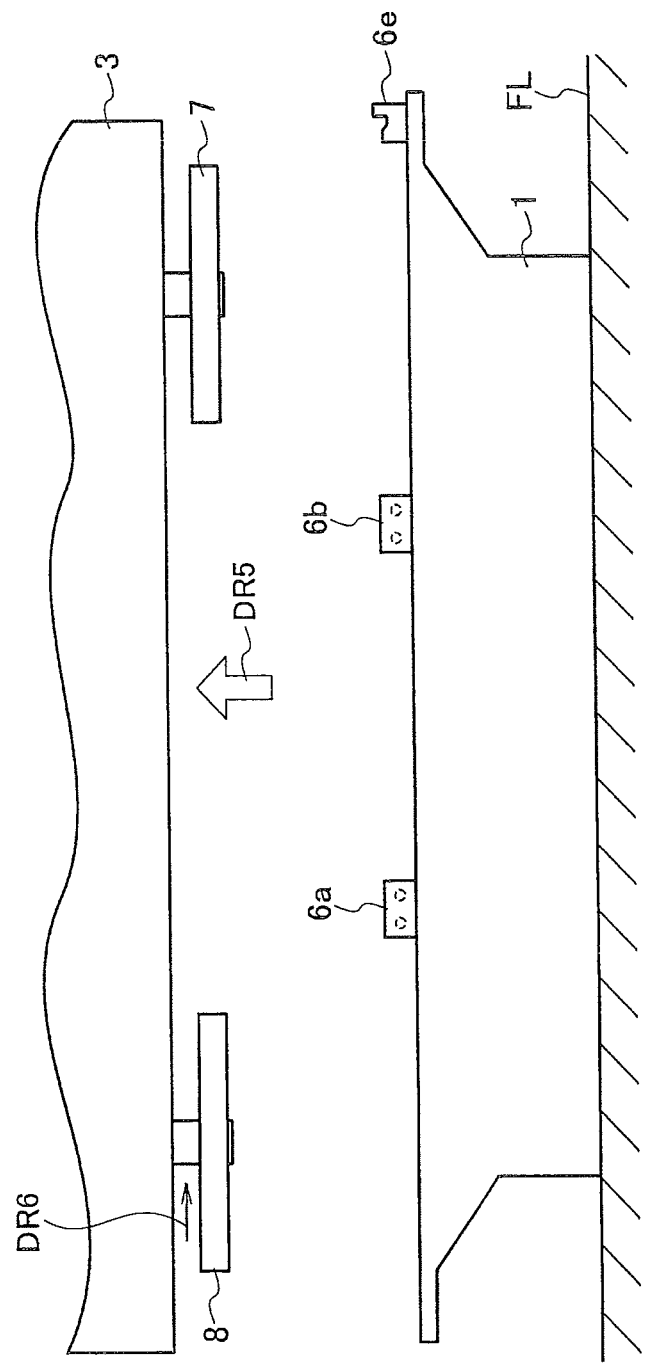
FIG. 7 It is a front view for explaining an installation operation of a saw blade (first process).

As shown in FIG. 7, the housing is lifted up to the waiting position (a direction DR5: i.e. an upward direction of the double-headed arrow DR1 in FIG. 1) (step S1). In addition, the wheel 8 is moved horizontally (a direction DR6: i.e. a rightward direction of the double-headed arrow DR2 in FIG. 1 and FIG. 2), and thereby the distance between the axis lines of the wheels 7 and 8 is set to the minimum value P2 (step S2).

Figure 8:
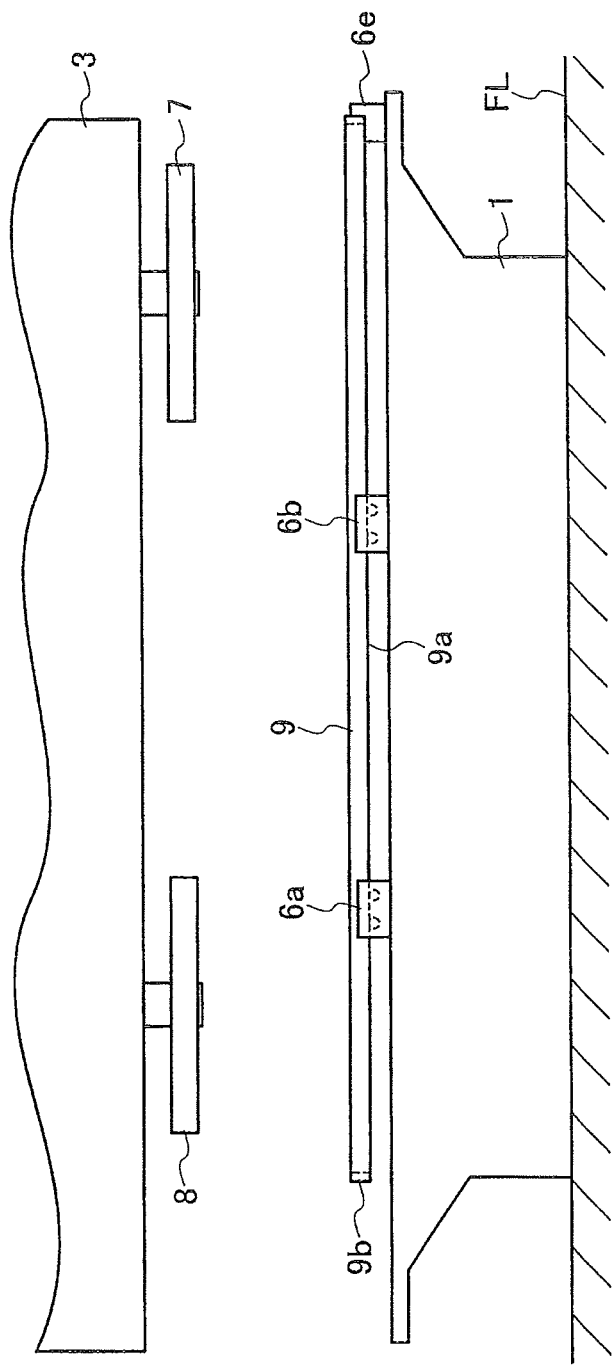
FIG. 8 It is a front view for explaining the installation operation of the saw blade (second process).
Figure 9:
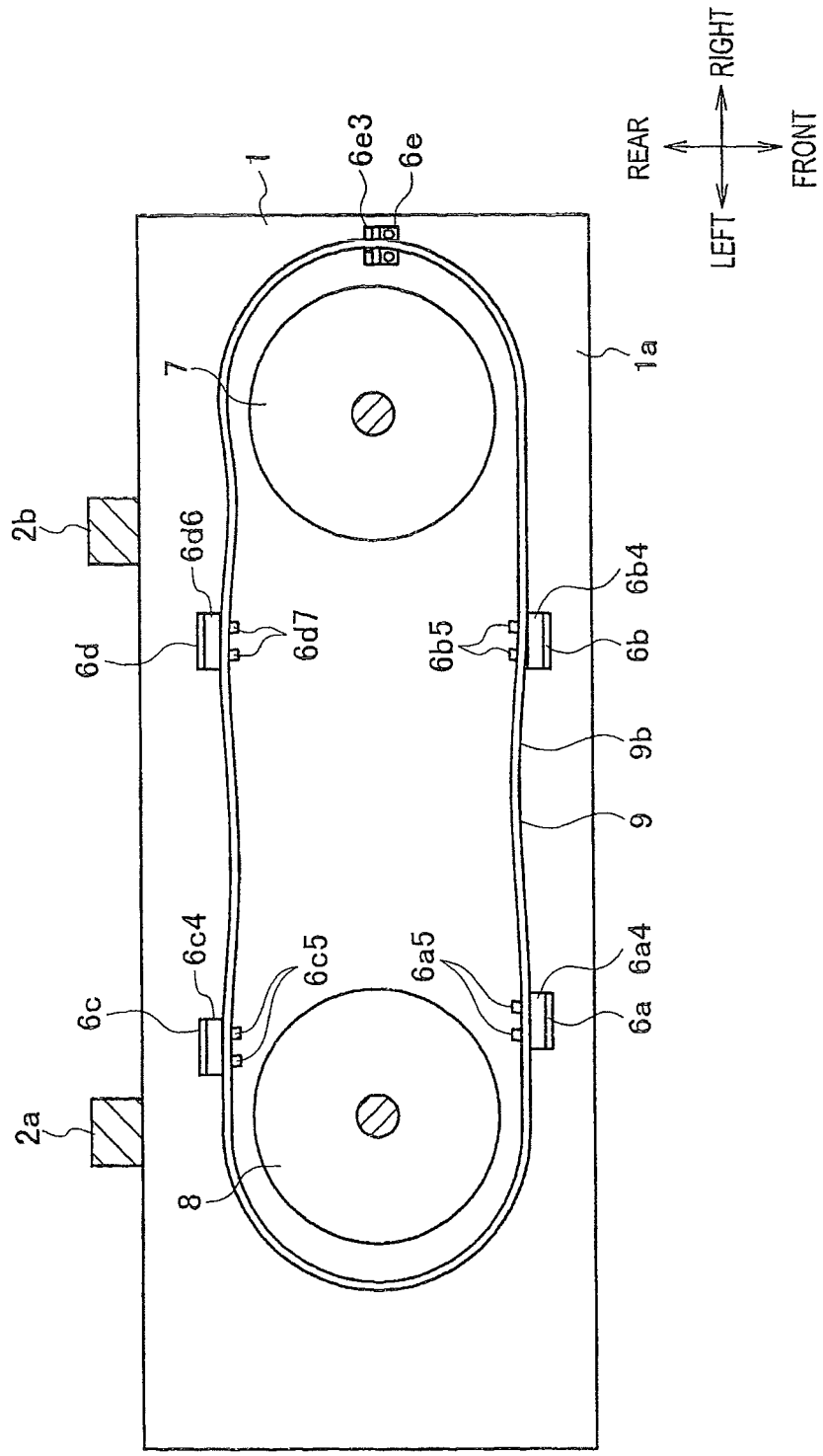
FIG. 9 It is a front view for explaining the installation operation of the saw blade (second process).

Next, as shown in FIG. 8 and FIG. 9, the saw blade 9 is set on the saw blade guides 6a to 6e by an operator (step S3). The saw blade 9 forms into an almost exact circular shape when it is laid with no external force applied thereto. Here, by being set on the contact portions t6a to t6e of the saw blade guides 6a to 6e, the saw blade 9 is deformed into an oval shape that is similar to a shape thereof when being installed. Therefore, the contact portions t6a to t6e contact with a lower edge 9a (the lower edge teeth 9h) of the saw blade 9 to support the saw blade 9, and contact with an outer side-face 9b of the saw blade 9 to keep a shape of the saw blade 9 in an suitable shape for the installation.

Figure 10:
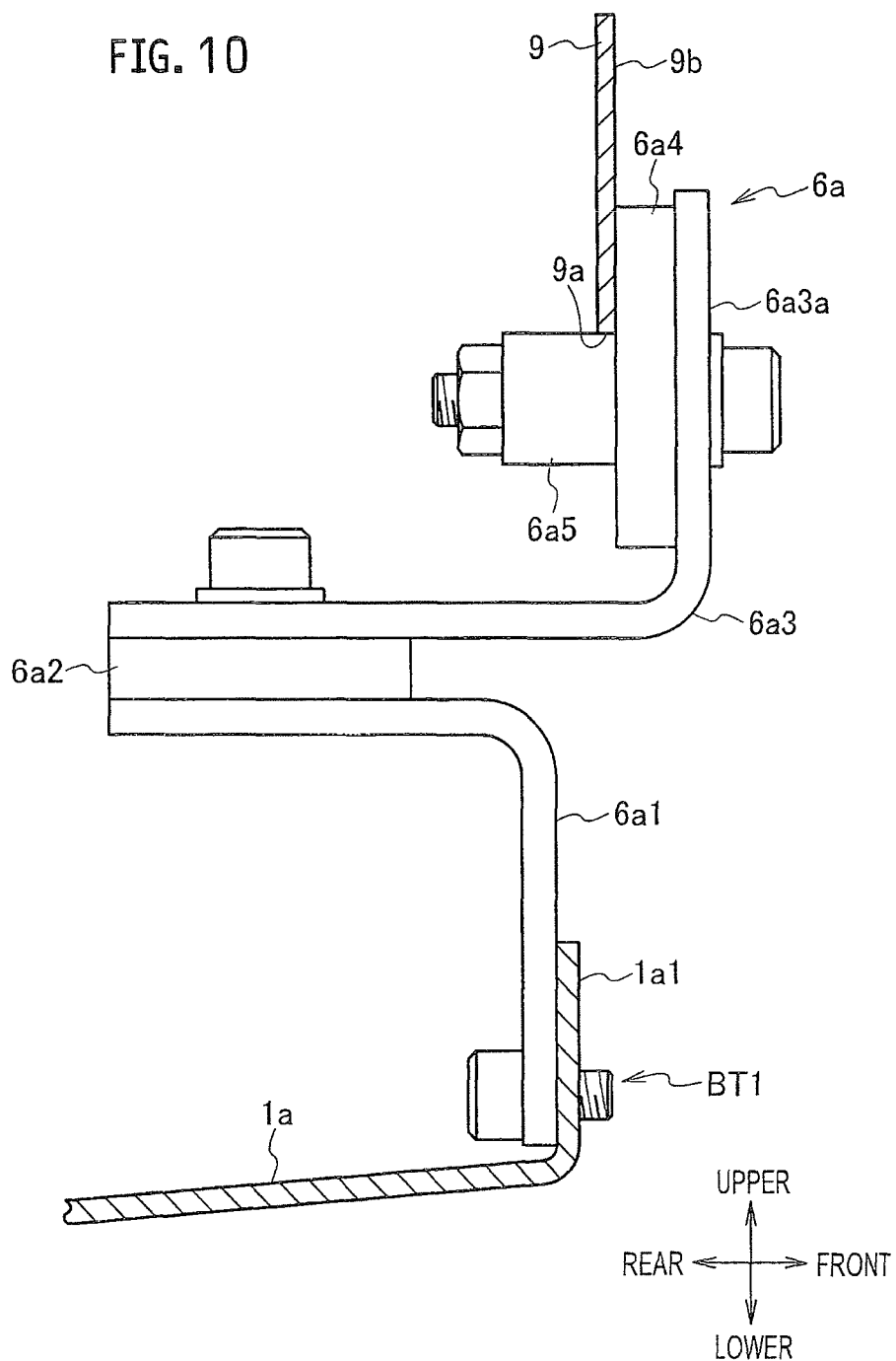
FIG. 10 It is a side view of the saw blade guide 6a on which the saw blade is set.

The saw blade 9 set on the saw blade guides 6a to 6e will be described in detail. As shown in FIG. 10, the lower edge 9a of the saw blade 9 contacts with the edge contact portions 6a5 of the saw blade guide 6a (Type A) to be supported from beneath, and the outer side-face 9b contacts with the side-face contact portion 6a4 to keep the shape of the saw blade 9. Similarly with respect to the saw blade guides 6b and 6c (Type A), the lower edge 9a contacts with the edge contact portions 6b5 and 6c5 to be supported from beneath, and the outer side-face 9b contacts with the side-face contact portions 6b4 and 6c4 to keep the shape of the saw blade 9.

With respect to the saw blade guide 6d (Type B), the saw blade 9 is set thereon in its above-mentioned normal state.

Figure 11:
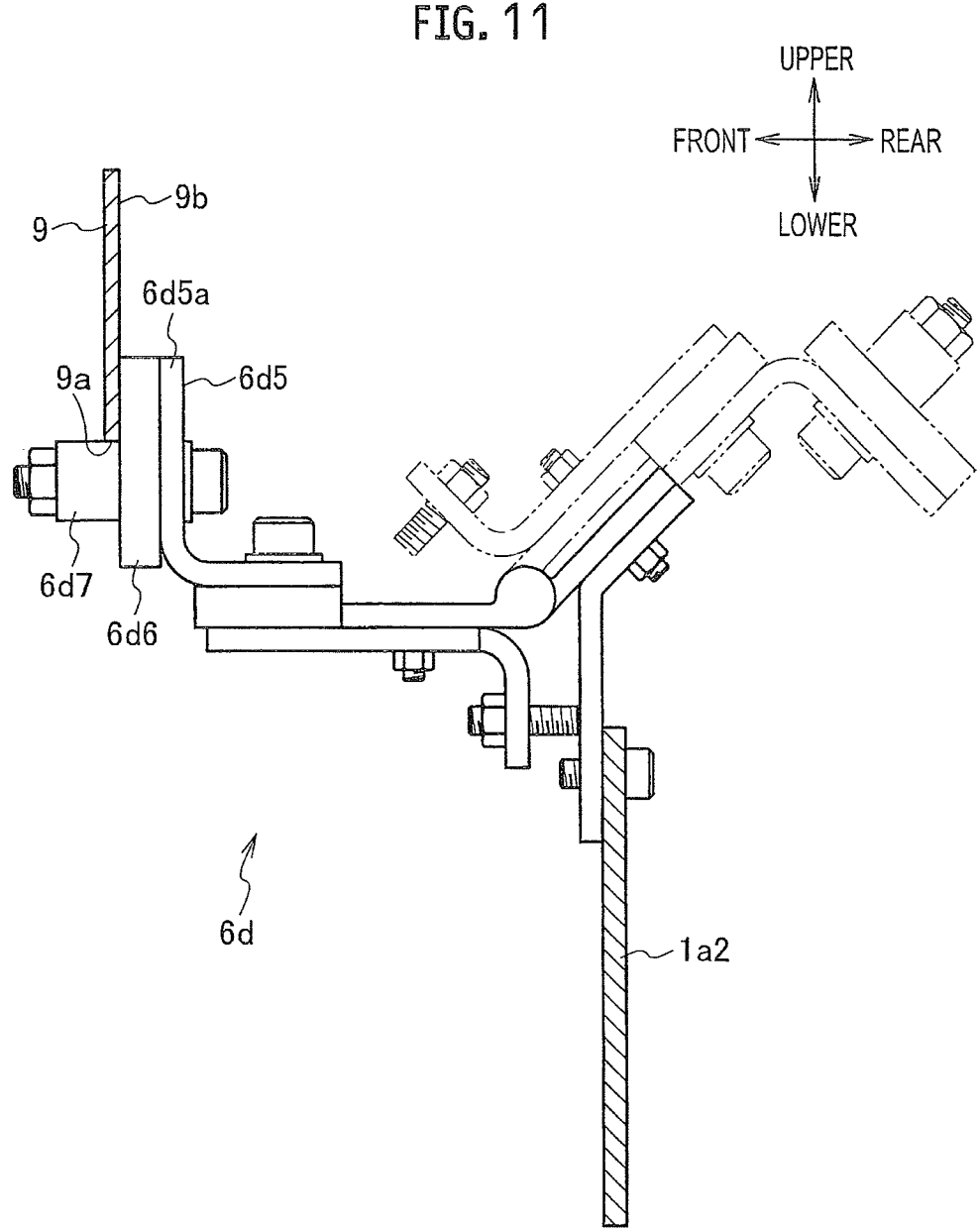
FIG. 11 It is a side view of the saw blade guide 6d on which the saw blade is set.
Figure 12:
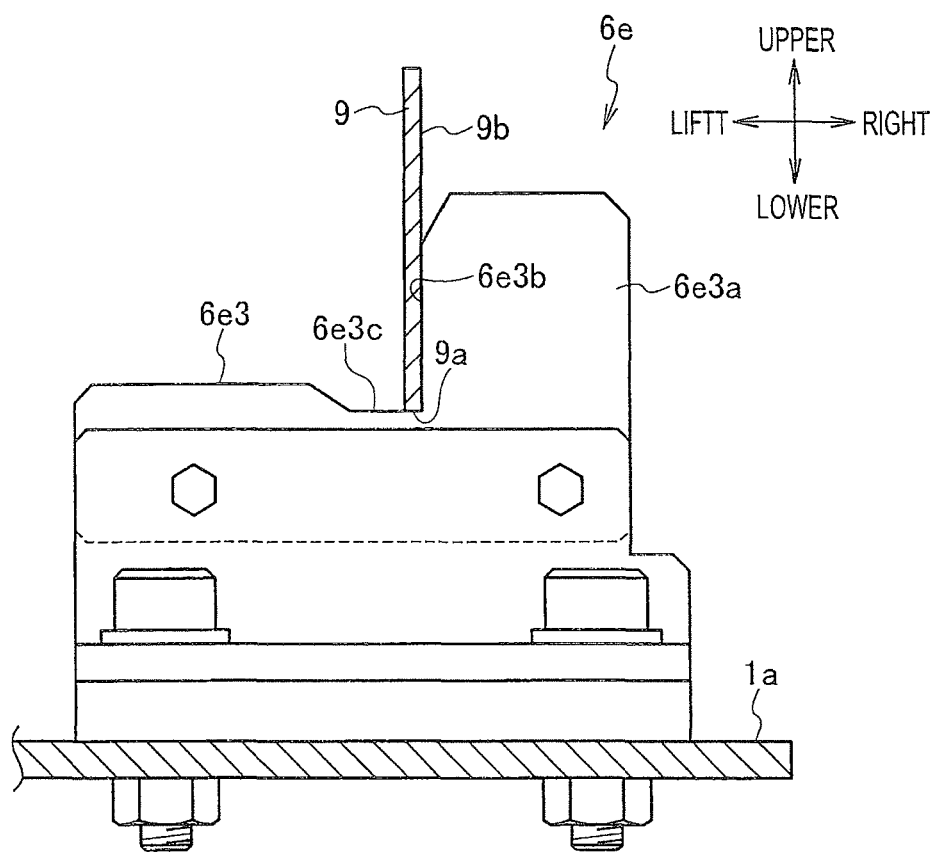
FIG. 12 It is a front view of the saw blade guide 6e on which the saw blade is set.

As shown in FIG. 11, the lower edge 9a of the saw blade 9 contacts with the edge contact portions 6d7 of the saw blade guide 6d to be supported from beneath, and the outer side-face 9b contacts with the side-face contact portion 6d6 to keep the shape of the saw blade 9. With respect to the saw blade guide 6e (Type C), as shown in FIG. 12, the lower edge 9a of the saw blade 9 contacts with the notched portion 6e3c of the saw blade guide 6e to be supported from beneath, and the outer side-face 9b contacts with the side-face contact portion 6e3c (the vertical edge 6e3b) to keep the shape of the saw blade 9. At this time, the saw blade 9 tends to expand outward, so that the lower edge 9a is smoothly introduced onto the notched portion 6e3c by the inclined edge 6e3d.

Consequently, as shown in FIG. 9, the front expansion of the saw blade 9 is restricted by a pair of the saw blade guides 6a and 6b, the rear expansion is restricted by a pair of the saw blade guides 6c and 6e, and the right expansion is restricted by the saw blade guide 6e. Even with no left restriction, the oval shape of the saw blade 9 can be kept. The saw blade guides 6a to 6e are disposed so as to insert the wheels 7 and 8 with the minimum distance of their axial lines into an region surrounded by the saw blade 9 deformed into the oval shape. Namely, as shown in FIG. 1 and FIG. 2, in a case where only one of the pair of the wheels 7 and 8 can be moved horizontally, all of the saw blade guides 6a to 6e are disposed on a side of the wheel 7 with respect to a flat plane SF that includes the rotating axis line CL2 of the wheel 8 positioned at its closest position to the wheel 7 (the distance of their axial lines=the minimum value P2) and intersects with a center line CL3 intersecting with the rotating axis lines CL1 and CL2 of the wheels 7 and 8. In other words, all of the saw blade guides 6a to 6e are disposed on a side of the wheel 7 along the moving direction of the horizontally-movable wheel 8 (the double-headed arrow DR2) with respect to the rotating axis line CL2 of the wheel 8 positioned at its closest position to the wheel 7 (the distance of their axial lines=the minimum value P2).

Figure 13:
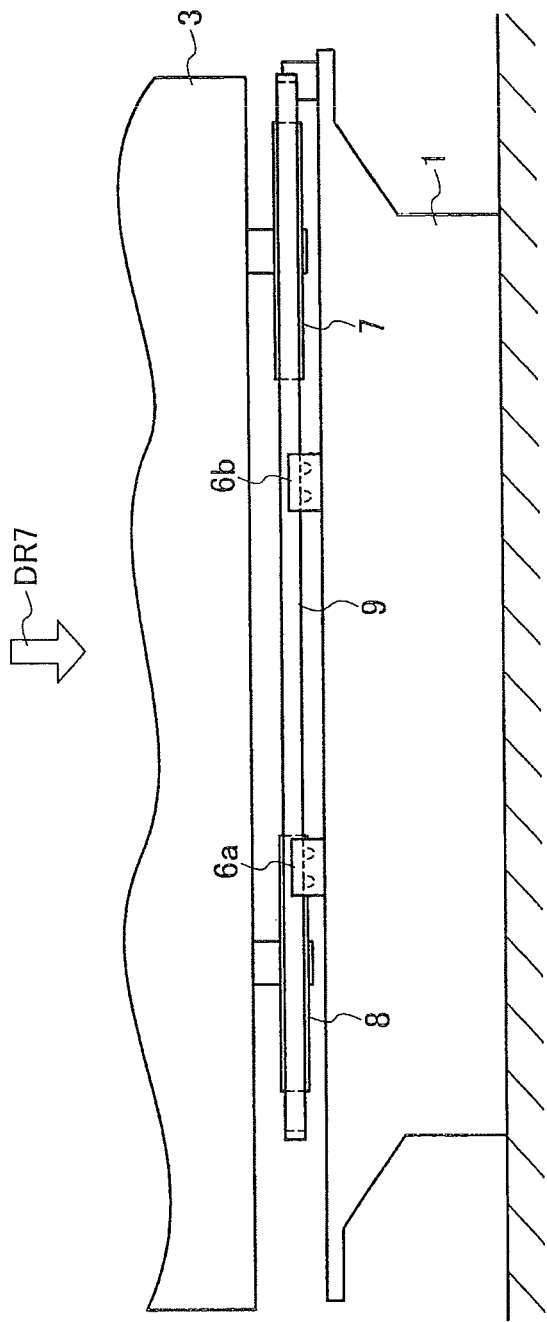
FIG. 13 It is a front view for explaining the installation operation of the saw blade (third process).

As shown in FIG. 13, after the saw blade 9 is set on the saw blade guides 6a to 6e, the housing 3 is moved downward (a direction DR7: i.e. a downward direction of the double-headed arrow DR1 in FIG. 1) to be set at the installation position where the height level of the wheels 7 and 8 are almost identical to the height level of the saw blade 9 (step S4). Subsequently, as shown in FIG. 14, the wheel 8 is moved horizontally by the drive unit M3 (a direction DR8: i.e. a leftward direction of the double-headed arrow DR2 in Fig. 1 and FIG. 2), and thereby the distance between the axis lines of the wheels 7 and 8 is expanded (step S5). An inner side-face 9c of the saw blade 9 contacts with outer circumferential surfaces of the wheels 7 and 8, and there by the saw blade 9 is tensed laterally.

As the result, a distance of the saw blade 9 in a front-back direction is made narrowed, and thereby the saw blade 9 is removed from the contact portions t6a to t6d of the saw blade guides 6a to 6d. In addition, also the saw blade 9 is moved leftward along with the leftward travelling of the wheel 8, and thereby the saw blade 9 is removed also from the contact portion t6e of the saw blade guide 6e. In the removal of the saw blade 9 from the contact portion t6e, the saw blade 9 can slide upward along the inclined edge 6e3d, so that it can be removed from the notched portion 6e3c.

The wheel 8 is moved horizontally to a position where a tensile force applying to the saw blade 9 reaches a preset value. Here, the traveling of the wheel 8 by the drive unit M3 is carried out with a predetermined speed change pattern (constant or variable). According to this, it is possible to preliminarily know a specified time (a traveling of the wheel 8) required until the tensile force of the saw blade 9 reaches the preset value. A time from the state where the distance between the axis lines of the wheels 7 and 8 is measured by the timer Tm, so that whether or not the tensile force of the saw blade 9 reaches the preset value is determined by whether or not the measured time reaches the specified time. Namely, in a case of using the sensor M3s for measuring the tensile force, whether or not the tensile force of the saw blade 9 reaches the preset value is determined based on the detection result of the sensor M3s (step S6). Alternatively, in a case of using the timer Tm instead of the sensor M3s, whether or not the tensile force of the saw blade 9 reaches the preset value is determined based on the measured time by the timer Tm (step S6). The determination in step S6 may be made by a preliminarily implemented program in the external computer (not shown in the drawings), or may be made by an operator based on a displayed value. When it is determined that the tensile force reaches the preset value, the horizontal travelling of the wheel 8 is stopped, and thereby the expansion of the distance of the axis lines is stopped (step S7).

In the saw blade guides 6a to 6d, lengths of the edge contact portions 6a5, 6b5, 6c5 and 6d7 that support the saw blade 9 from beneath and a length on an inner side from the vertical edge 6e3b of the saw blade guide 6e (the guide plate 6e3) are set up so that they can support the saw blade 9 from beneath until the saw blade 9 gets into a state where it no longer drops off from the wheels 7 and 8 while the wheel 8 is moved horizontally.

After the saw blade 9 is tensed between the wheels 7 and 8 with the preset tensile force, the housing 3 is lifted up to the waiting position (step S8). If the protection cover is attached to the lower edge teeth 9h, it is removed at this stage. An alignment of the saw blade 9 with respect to the wheels 7 and 8 is carried out adequately by rotating the wheels 7 and 8 by the drive unit M2. The installation operation of the saw blade 9 onto the band saw machine 51 is completed. Removal of the saw blade 9 from the band saw machine 51 is basically done by reversed processes to those of the installation operation.

Each process (steps S1 to S8) may be carried out according to commands made by an operator for each process, or may be automatically carried out processes, other than setting of the saw blade 9 on the saw blade guides 6a to 6e by an operator, in the band saw machine 51 by a computer that executes a preliminarily programmed program.

The band saw machine 51 cuts the workpiece W at its cutting area A (see FIG. 2) on a feeding path of a rear side of the saw blade 9. In the present embodiment, the saw blade guide 6d is disposed just downstream from the cutting area A along the feeding direction DR3 of the rear side of the saw blade 9. Hence, much swarf may, with high probability, attaches on the saw blade guide 6d that is in the normal state. Therefore, the saw blade guide 6d can be changed into the evacuation state by swinging the contact portion t6d about the hinge 6d2. The saw blade guide 6d that in the evacuation state is evacuated from the feeding path, so that the attachments of the swarf on the contact portion t6d can be prevented. Namely, the saw blade guide 6d is set into the normal state during the installation operation of the saw blade 9, and changed into the evacuation state by being rotated at times other than the installation operation (while cutting the workpiece W).

As described above, the contact portion t6a of the saw blade guide 6a can slightly swing due to the rubber spacer 6a2. The contact portions t6b to t6e can similarly swing. Therefore, even when an external force applies to the saw blade 9 due to a set state of the saw blade 9 on the saw blade guides 6a to 6e, the contact portions t6a to t6e swing so as to make the saw blade 9 less affected by the external force. Hence, damages of the saw blade 9 during the installation operation of the saw blade 9 can be prevented effectively.

Note that the present invention is not limited by the above-described embodiment. For example, the saw blade guides 6to 6emay not be fixed with the base 1, but may be provided detachably. In addition, it is sufficient as long as the saw blade guides 6ato 6ecan support the saw blade 9 from beneath (restriction of the drop-off) and can keep the deformed shape of the saw blade 9 (restriction of the expansion), and their structures are not limited to those in the above embodiment.

A protection cover or an openable/closable door for keeping one's hand away from movable parts of the band saw machine 51 may be provided. In this case, the band saw machine 51 may be configured so that it cannot be operated, if the protection cover or the openable/closable door is closed, not only in the cutting operation of the workpiece W but also in the installation operation of the saw blade 9 (excluding the setting operation of the saw blade 9 onto the saw blade guides 6a to 6e). According to this, operator's safety can be secured.

In addition, lateral positions of the saw blade guides 6a to 6d are not limited to those in the above embodiment. It is sufficient as long as the saw blade guides 6a to 6d are disposed at positions where they can deform the saw blade 9 into an oval shape and can keep it. Further, not only one of the wheels 7 and 8 is movable, but both of them are made movable.

According to the band saw machine 51 (the method for installing the saw blade 9) in the present embodiment, it is sufficient that an operator only set the saw blade 9 on the saw blade guides 6a to 6e, it is not needed for the operator to do operations that impose a heavy burden, such as to support or lift up a jig. Therefore, an operator's burden can be reduced drastically. In addition, a large-sized jig for supporting an entire of the saw blade 9 is not needed, and it is sufficient to provide only the small-sized saw blade guides 6a to 6e. Further, since the saw blade guides 6a to 6e are versatile components that are not affected by the distance between the wheels 7 and 8 (three Types A to C in the present embodiment), production costs of a jig can be reduced drastically.

What is claimed is:

1. A horizontal band saw machine comprising:
a base;
a housing that is disposed above the base and movable vertically;
a pair of wheels that are disposed horizontally at a lower portion of the housing, each of the wheels includes an axis line and a distance between the axis lines is changeable;
a band saw blade that is endless and is configured to be looped over and installed on the pair of wheels; and
a plurality of saw blade guides that are provided on an upper plate of the base and on which the band saw blade is configured to be set when the band saw blade is looped over and installed onto the pair of wheels, wherein
the housing is configured to move vertically between an installation position at which the band saw blade is configured to be set on the saw blade guides and a cutting end position at which the band saw blade is configured to cut a workpiece when the band saw blade is looped over and installed on the pair of wheels,
the installation position being disposed vertically lower than the cutting end position,
the housing is configured to move the pair of wheels to the installation position,
when the band saw blade is set on the saw blade guides the pair of wheels are configured to be inserted into a region surrounded by the band saw blade by being moved vertically downward by the housing to the installation position in a state where the distance between the axis lines is shortened, and
each of the saw blade guides includes an edge contact portion that is configured to contact a lower edge of the band saw blade and a side-face contact portion that is configured to simultaneously contact an outer side-face of the band saw blade while the respective edge contact portion is in contact with the lower edge of the band saw blade.

2. The band saw machine according to claim 1, wherein the saw blade guides contact with the band saw blade at plural positions to support the band saw blade from beneath.

3. The band saw machine according to claim 2, wherein only one of the pair of wheels is movable to change the distance between the axis lines, and
all of the saw blade guides are disposed on a side of the other of the pair of wheels with respect to a flat plane that includes the axis line of the one of the pair of wheels and intersects with a center line intersecting with the axis lines of the pair of wheels.

4. A method for installing a band saw blade in a horizontal band saw machine in which an endless band saw blade is looped over a pair of wheels that are disposed horizontally and a distance between whose axis lines is changeable, the method comprising:
setting the band saw blade on a plurality of saw blade guides that are disposed on an upper plate of a base beneath the pair of wheels, each of the saw blade guides includes an edge contact portion that contacts a lower edge of the band saw blade and a side-face contact portion that simultaneously contacts an outer side-face of the band saw blade while the respective edge contact portion is in contact with the lower edge of the band saw blade;
moving the pair of wheels, the distance between whose axis lines being shortened, to a height level of the band saw blade by inserting the pair of wheels into an region surrounded by the band saw blade set on the saw blade guides; and
installing the band saw blade onto the pair of wheels by expanding the distance between the axis lines.

5. The band saw machine according to claim 1, wherein the upper plate of the base includes a workpiece support that supports the workpiece when the workpiece is cut by the band saw blade, and
the workpiece support is surrounded by the plurality of saw blade guides.

6. The band saw machine according to claim 1, wherein the plurality of saw blade guides are provided directly on the upper plate of the base.

7. The method for installing the band saw blade according to claim 4, further comprising:
placing a workpiece on a workpiece support that is provided on the upper plate of the base and that is surround by the plurality of saw blade guides, which are provided directly on the upper plate of the base; and
cutting the workpiece with the band saw blade.

* * * * *